United States Patent [19]
Cucchi

[11] Patent Number: 5,562,381
[45] Date of Patent: Oct. 8, 1996

[54] BAR LOADERS FOR AUTOMATIC LATHES

[75] Inventor: Pietro Cucchi, Bussero, Italy

[73] Assignee: Pietro Cucchi S.p.A., Italy

[21] Appl. No.: 246,998

[22] Filed: May 20, 1994

[30] Foreign Application Priority Data

Jun. 11, 1993 [IT] Italy ................. MI93A1246

[51] Int. Cl.⁶ ........................................ B23Q 5/22
[52] U.S. Cl. .................................... 414/18; 82/127
[58] Field of Search .................. 414/16, 17, 18; 82/127

[56] References Cited

U.S. PATENT DOCUMENTS 3,924,494 12/1975 Azuma .
5,320,008 6/1994 Cucchi ........................... 414/18

FOREIGN PATENT DOCUMENTS

| 0026370 | 4/1981 | European Pat. Off. . |
| 587248 | 3/1994 | European Pat. Off. .............. 82/127 |
| 3128958 | 5/1982 | Germany . |
| 5-309502 | 11/1993 | Japan ...................................... 82/127 |
| 396569 | 1/1966 | Switzerland . |
| 424423 | 5/1967 | Switzerland . |

*Primary Examiner*—Donald W. Underwood
*Attorney, Agent, or Firm*—Shlesinger, Fitzsimmons & Shlesinger

[57] ABSTRACT

A loading device comprises a pusher for feeding a bar along a guide towards a lathe spindle. The pusher comprises a first thrust part (16, 116) which is constrained to traversing means (14) along, said path. Said first part comprises a constraint element (18, 118) for coupling with a complementary constraint element (19, 119) located on a second and removable pusher part (17, 117) which constitutes the axial extension of the first part along the guides. The two elements (18, 118, 19, 119) extend axially between the first and second parts and have their transverse dimension within the transverse dimension of the guide to run therein.

16 Claims, 3 Drawing Sheets

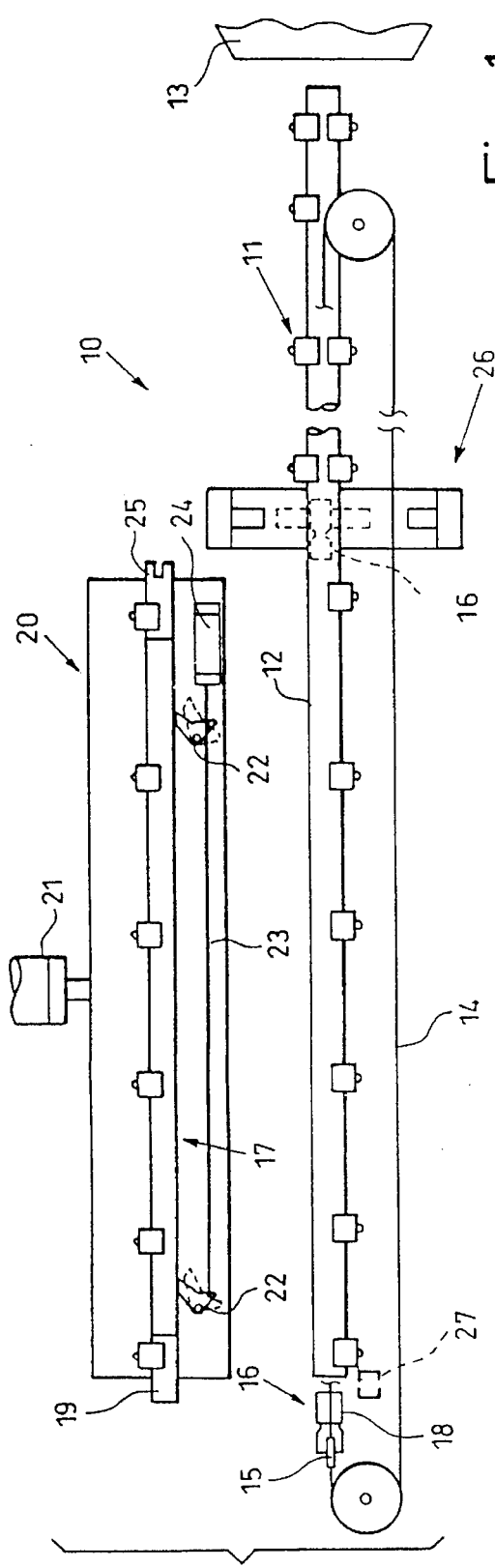
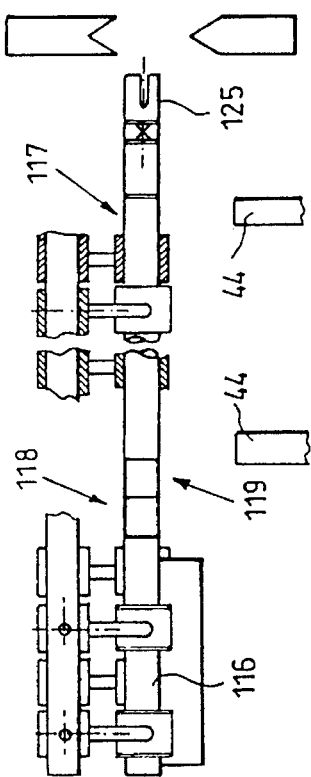
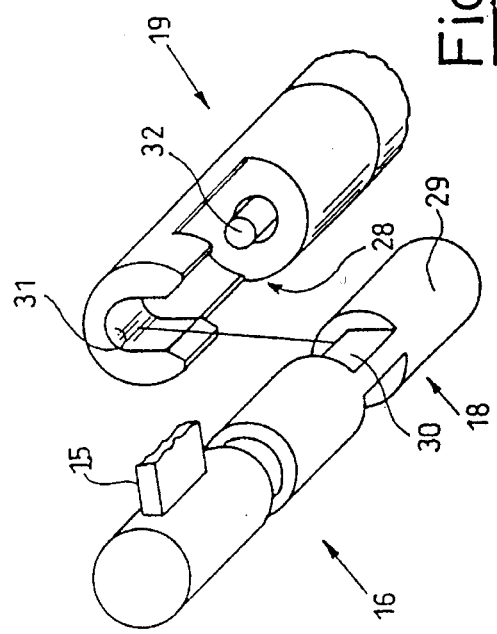

5,562,381

BAR LOADERS FOR AUTOMATIC LATHES

BACKGROUND OF THE INVENTION

The present invention relates to a loader for insertion of bars in automatic lathes.

There are known loaders of bars into lathes comprising a pusher pushing axially a bar along running guides to introduce it progressively into the lathe spindle. A problem with said loaders is the space occupied. Indeed, the length of the loader must be theoretically equal to the sum of the length of the bar to be loaded plus the length of the pusher. The pusher must then be sufficiently long to push the bar completely into the lathe spindle.

To seek to reduce the space occupied, in the known art there have peen proposed loaders having two pushers, one acting along the first part of the thrust path and one acting along the second part. In this manner the first pusher can be provided relatively short since it does not have to enter the spindle and the second pusher longer since it does not need to follow the bar except when the latter is already partially inside the spindle. The need to provide two separate kinematic mechanisms for movement of the two pushers involves however construction complications and relatively high costs.

To reduce the costs and complications there have also been proposed loaders in which the two pushers use the same kinematic mechanism, selective constraint means permitting choice of which pusher is to be moved each time. The complication of said systems is however high.

There have also been proposed loaders in which the longer pusher arranges itself ahead of the short pusher. The constraint means between the pushers are however always outside the space occupied by the pusher and interfere with the bar guides, causing construction complications. The pusher with the extension is not assimilable as to behaviour with an individual pusher but produces vibrations and operating defects.

The purpose of the present invention is to obviate the above mentioned shortcomings by supplying bar loaders in which the pusher is provided in two separable parts with the two parts behaving upon connection as a single pusher which passes without problems into the bar guides.

SUMMARY OF THE INVENTION

In view of said purpose it has been sought to provide in accordance with the present invention a loading device comprising a pusher for feeding a bar along a guide towards a lathe spindle and comprising a first thrust part which is constrained to traversing means along said path and said first part comprising a constraint element for coupling with a complementary constraint element located on a second and removable part of the pusher which constitutes an axial extension to the first part along the guides and characterised in that the two elements extend axially between a first and a second part and have a transverse dimension within the transverse dimension of the guide to run therein.

BRIEF DESCRIPTION OF THE DRAWINGS

To clarify the explanation of the innovative principles of the present invention and its advantages compared with the known art there is described below with the aid of the annexed drawings a possible embodiment thereof by way of non-limiting example applying said principles. In the drawings:

FIG. 1 shows a partial schematic side view of a first bar loader provided in accordance with the present invention, FIG. 2 shows an exploded perspective view of a disconnection end for the pusher of the loader of FIG. 1, FIG. 8 shows a top view of the loader of FIG. 6.

DETAILED DESCRIPTION OF THE INVENTION

Figure 3:
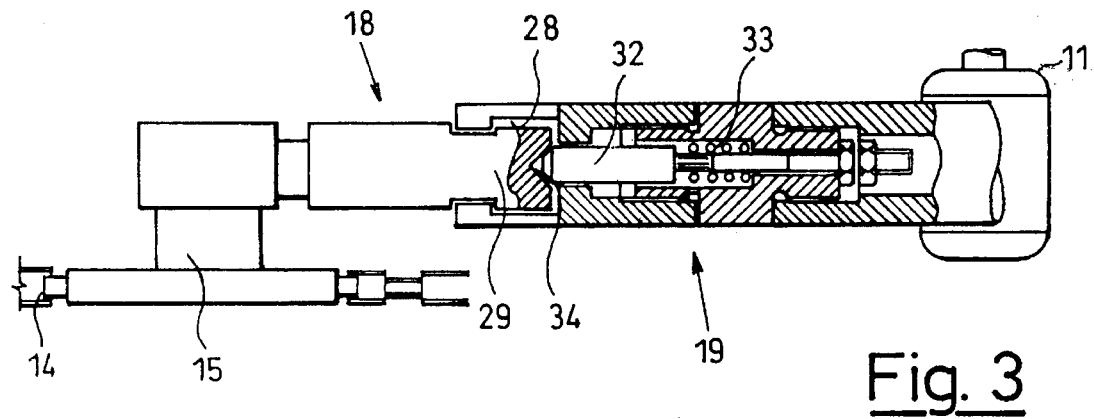
FIG. 3 shows a cross sectioned longitudinal view of the end of FIG. 2.

With reference to the figures FIG. 1 shows a bar loader indicated as a whole by 10. The loader comprises a guide 11 along which is made to run a bar 12 to be fed axially to a spindle of a lathe 13. A kinematic mechanism 14, e.g with powered chain, slides a cursor 15 along the guide to give the bar the feed thrust.

The pusher for moving the bar along the guides and into the lathe spindle comprises a first part 16 constrained to the cursor 15 and a second part 17 which is removable. The first part 16 comprises at its head constraint means 18 for engagement in complementary constraint means 19 present on the tail of the second part 17.

As clarified below, the constraint means are provided axial to the pusher so that the first and second parts, when constrained, provide a single long pusher passing in the bar guide. In other words, the engagement means have a transverse dimension such as to be completely contained in the cross section of the guide so that the pusher in two parts behaves basically as a pusher in a single piece.

As may be seen in FIG. 1 the second part of the pusher traverses transversely to the guides by means of a hoisting carriage 20 moving between the raised position of FIG. 1 and a lowered position to insert the second part of the pusher into the bar guides. The movement is achieved e.g. by means of a compressed air cylinder actuator 21.

Advantageously the carriage 20 comprises the upper half of the guides 11, provided e.g. with channel elements aligned in accordance with the known art, for the entire length of the removable part of the pusher. Gripping jaws 22 block the removable part of the pusher against the upper half-guides to permit raising thereof. For example, the gripping jaws 22 can comprise square levers interconnected by a tierod 23 to be operated by a piston 24 so as to move between the raised blocking position shown in solid lines and the free lowered position shown in broken lines. During operation, initially the carriage 20 is raised and known loading means (not shown) position the bar on the guides, which have a part not opposite the carriage 20 which opens radially for entry of the bar.

The first part of the pusher is then traversed by the cursor 15 so as to feed the bar on the guides towards the spindle and the cursor completes a traverse until it reaches the position shown in broken lines in FIG. 1 just over the section involved by the carriage 20. The length of the traverse can coincide e.g. with the length of bar to be fed towards the lathe to cause the tip of the bar to reach a position near the machining tools.

After this the cursor returns to the initial position and the carriage 20 lowers the part 17 of the pusher so that the part 17 connects with the first part 16 forming therewith a long pusher lying in the guides. The gripping jaws 22 release the pusher so that the cursor can push them along the guides to completely feed the bar into the lathe. The long part of the pusher has at its head a gripping jaw 25 on the bar tail to permit extraction from the lathe of the bar stub remaining at the end of machining. Known removal means 26 grip the stub and disengage it from the clamp 25 to remove it from the loader so that a new bar can be fed. For feeding of the new bar the carriage rises again and disconnects the means 18, 19 and removes the extension part 17. As clarified below, the means 18, 19 can call for disconnection means 27.

FIGS. 2 and 3 show a first embodiment of connection means between a first and second part of the pusher. As may be seen in FIG. 2 the connection means comprise a seat 28 open radially to receive a complementary engagement end 29. The seat and the engagement end define mutual striking surfaces at least in the direction of axial running to prevent said running between the first and second parts upon radial insertion of the end in the seat. For example, the striking surfaces are provided by a radially narrow intermediate zone 30 inserting itself in a complementary narrow part 31 of the seat.

To provide means of preventing mutual rotation between the two parts of the pusher the narrow zone 31 is provided with a non-rotating cross section, e.g. formed generally like the letter U and complementary to the narrow zone 30 formed by two flat surfaces on two sides of the pusher. The gripping jaws 22 block the extension part 17 before raising of the carriage to allow keeping safely the alignment of the connection means upon rotation. As may be seen in FIG. 3 the end 19 comprises internally a cursor 32 for yielding connection which is pushed by a spring 33 axially into the seat 28 to engage in a complementary seat 34 at the head of the first part of the pusher 16. The thrust of the spring is sufficient to ensure keeping the connection between the parts 18 and 19 to permit simultaneously quick disconnection upon withdrawing of the carriage 20 from the guides. When the two parts are connected together the pusher thus formed behaves in all ways as a single pusher and can easily run along the guides.

Figure 4:
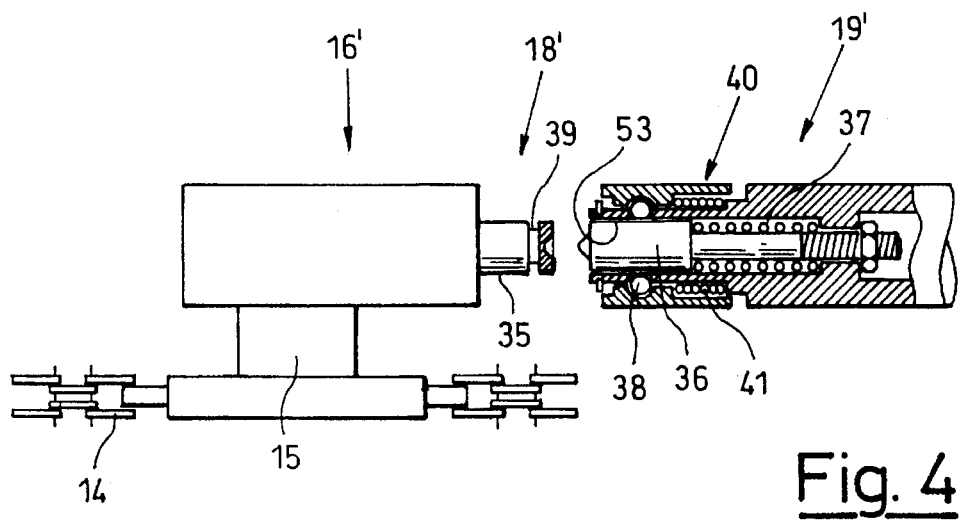
FIG. 4 shows a view of a second embodiment of a disconnection end in disconnected position.
Figure 5:
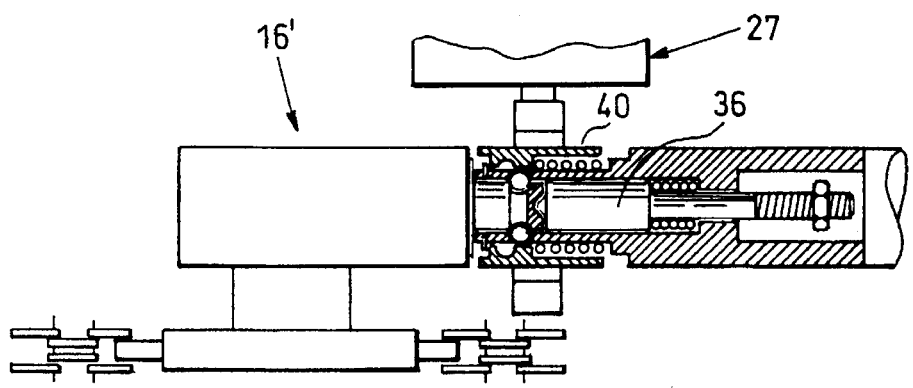
FIG. 5 shows a view of the end of FIG. 4 in connected position.

FIGS. 4 and 5 show a possible variation of the connection means 18, 19. As may be seen in said FIGS. the connection means comprise indicated by 18' and 19' an axial snap connection formed by a pin or tang 35 projecting axially from the part 16 to insert itself in a complementary seat 53 in the connection means 19' causing backing of a cursor 36 against the effect of a spring 37. Upon backing away of the cursor 36, balls 38 fall in a groove 39 in the tang to free a ringnut 40 which runs thus thrust axially by a spring 41. The connection thus arranges itself as in FIG. 5 with the balls held partially in the groove 39 by the ringnut 40 to prevent withdrawal of the tang 35.

To withdraw the tang disconnection means 27 seize the ringnut and cause it to traverse axially to again compress the spring 41 until the ringnut is brought back to the initial position in which the balls 38 can rise again from the groove 39 so that the spring 37 can push the tang back out of the connection seat.

In use, when the carriage 20 carries the extension in an axial position with the initial pusher 16 the cursor 15 is commanded to advance so that the pin or tang 35 connects in 19'. For disconnection the cursor 15 returns to the initial position and the clamp means 27 cause the ringnut to run as described above while the cursor 36 is left free to back out of the seat 53.

Figure 6:
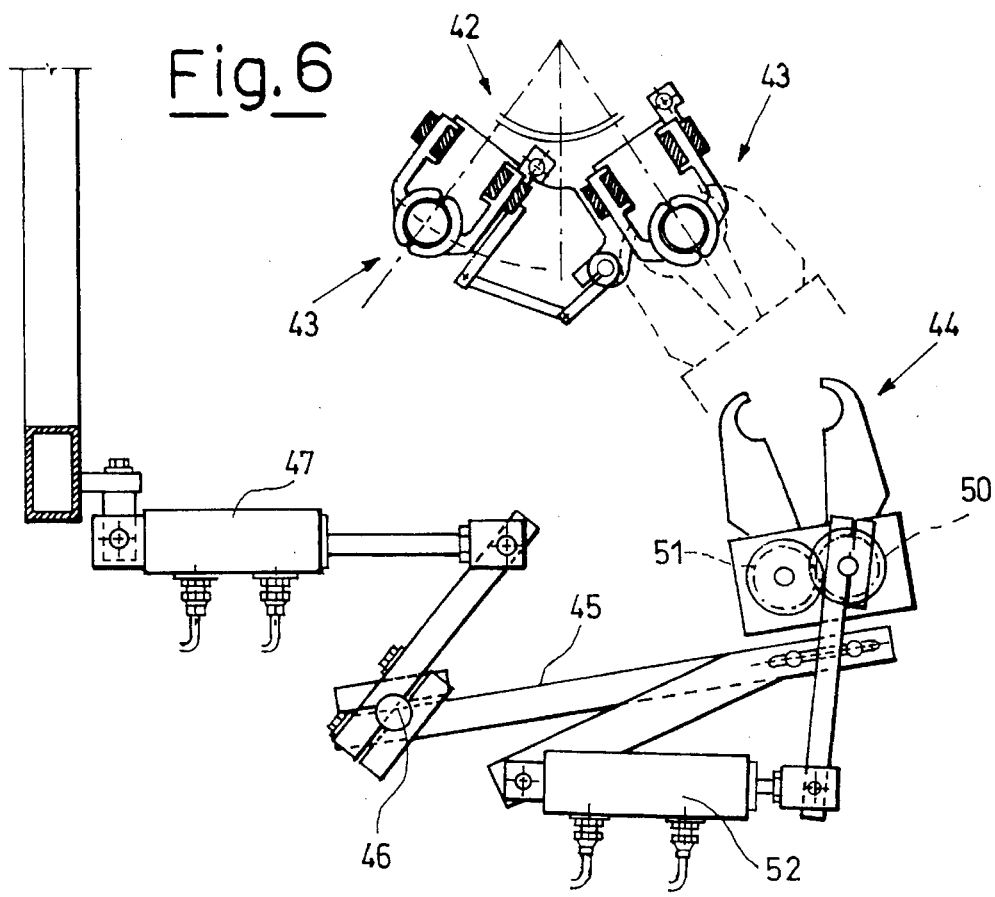
FIG. 6 shows a partial schematic cross section view of a second embodiment of a loader in accordance with the present invention.
Figure 7:
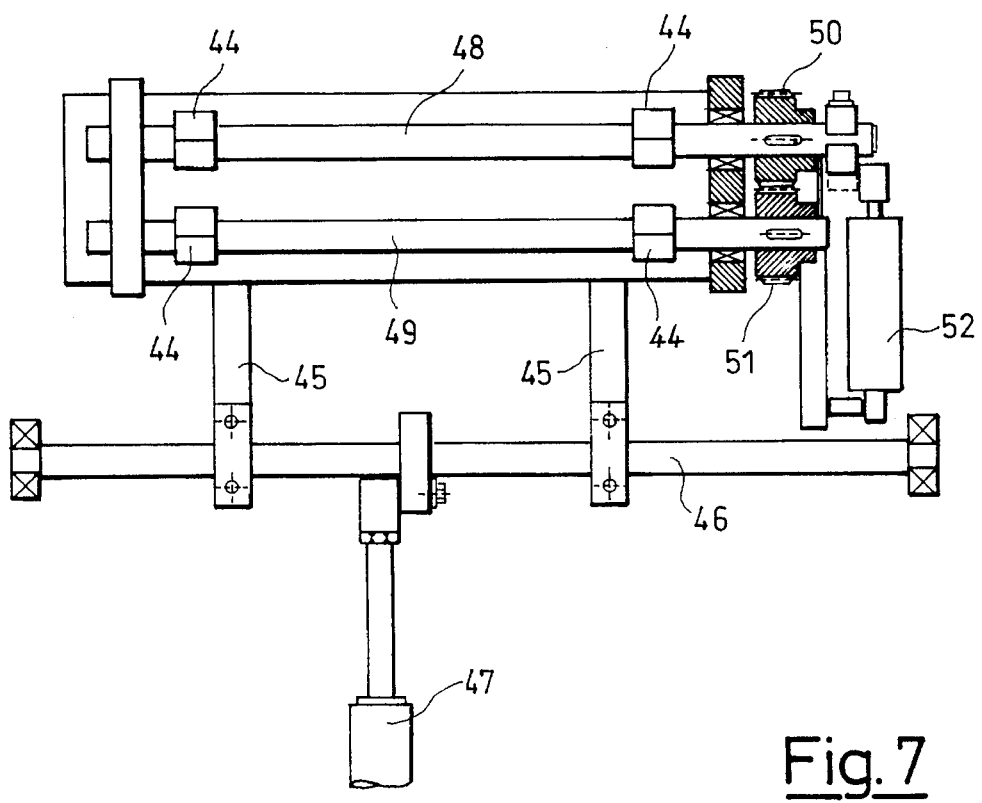
FIG. 7 shows a lower side view of the loader of FIG. 6.

In FIGS. 6, 7 and 8 is shown a loader having a variation of the traversing mechanism of the extension or second part 17 of the loader formed by the carriage 20. Said variation is particularly advantageous in the case of loaders of the type for multiple-spindle lathes, i.e. where there is a plurality of parallel guides rotating to move sequentially to the loading position. It is thus described for a loader of that type. Application also to single-spindle loaders of the above type is apparent to those skilled in the art.

As may be seen in FIG. 6 the loader comprises a rotating support 42 supporting guides 43 for the bars. The guides are e.g. formed by known aligned channel elements which as known can open or close for insertion therein of the bars. Upon rotation of the rotating support 42 the bars move sequentially into a bar insertion position. The pusher extension positioning and removal means comprise a pair of clamps 44 supported by arms 45 pivoted at 46 to be moved by means of an operating piston 47 between a retracted position shown in solid lines in FIG. 6 and an advanced or gripping position shown in broken lines.

As shown also in FIG. 7 the clamps 44 are supported by shafts 48, 49 coupled together by gears 50, 51. One of the two shafts can rotate in a closing angle of the clamps by means of an activator 52. Upon operation of the activator the two jaws of each clamp thus rotate synchronously to close or open.

As shown in FIG. 8 the pair of clamps 44 faces the extension 117 terminating at its head with a clamp 125 and its tail by connection means 119 to engage with complementary connection means 118 located at the head of the first part of the pusher 116 constrained to the movement means like the part 16 of FIG. 1.

The connection means 118, 119 are provided to have a transverse extension not greater than the transverse extension of the passage in the guides 43 and can be equal to those described above and indicated by 18, 19, 18', 19'.

From the description of the embodiment of FIG. 1 it is clear that connection and disconnection of the extension and feeding of the bar are possible. For example, the clamps 44 hold firmly the extension in its orientation for connection with the means of FIG. 2.

At this point it is clear that the pre-set purposes have been achieved by supplying bar loaders having pushers which, while forming an assembly behaving basically as a single pusher passing in the guides, can be disconnected to limit the length of the loader in relation to the length of the bars and the feeding path.

Naturally the above description of an embodiment applying the innovative principles of the present invention is given merely by way of example and therefore is not to be taken as a limitation of the patent right claimed here.

For example, the proportions between the two part of the pusher and the length of the respective feed paths depend on the actual practical exigencies.

In addition, in the embodiment of FIG. 6 the clamps can be more than two in relation to the length of the removable extension.

What is claimed is:

1. A loading device comprising a pusher for feeding a bar in a path axially thereof along a guide towards a lathe spindle, the pusher comprising a first pusher part, means to constrain said first pusher part for movement axially along the path, said first pusher part having a first coupling element on one end thereof, a second pusher part having on one end thereof a second coupling element complimentary to said first coupling element, said second pusher part being movable transversely of said path between a retracted position and an operative position in which said coupling elements releasably engage each other, whereby said second pusher part constitutes an axial extension of the first part along said path, and characterised in that said two coupling elements extend axially between the first and second parts and have their transverse dimension within the transverse dimension of the guide to run therein, and means for gripping and moving the second part of the pusher radially of said path between said retracted and operative positions thereof, respectively.

2. The device in accordance with claim 1 characterised in that the gripping and moving means comprise means for maintaining axial orientation between said first and second parts at least adjacent said operative position of said second part.

3. The device in accordance with claim 1 characterised in that the gripping and moving means comprise gripping clamps disposed releasably to grip the second part of the pusher.

4. The device in accordance with claim 3 characterised in that said guide comprises two sets of cooperating guide elements, the clamps comprise gripping jaws positioned adjacent one side of the second part, and operable to push said second part against one set of said guide elements providing a longitudinal half of said guide opposite said second pusher part, and said one set of guide elements being movable with the second pusher part towards said operative position.

5. The device in accordance with claim 3 characterised in that the clamps are supported on an arm support pivoted at one end to move between a first and a second position along a trajectory having the form of an arc of a circle.

6. The device in accordance with claim 3 characterised in that each clamp has a pair of gripping jaws each of which is supported on one of two different axles and the two axles thus provided bearing keyed gears coupled together, and one of said axles being powered for the closing rotation of the respective jaws and the other axle moving through the geared coupling in the opposite direction for complementary closing movement of the respective jaws.

7. The device in accordance with claim 1 characterised in that the guide comprises a plurality of spared parallel guides rotating around a common axle to move in sequence into a position of bar feeding therein.

8. The device in accordance with claim 1 characterised in that for mutual coupling one of said two coupling elements has therein a recessed seat for releasably retaining therein a complementary portion of the other coupling element.

9. The device in accordance with claim 8 characterised in that the seat is open radially to receive from the radial direction the complementary portion of the other coupling element, and the seat and complementary portion defining mutual striking surfaces at least in the axial running direction of the pusher to prevent axial movement between the first and second parts upon radial insertion of the portion in the seat.

10. The device in accordance with claim 9 characterised in that said complementary portion comprises an intermediate zone radially narrow to engage in a complementary narrow part of the seat.

11. The device in accordance with claim 10 characterised in that at least one part of the seat comprises means for preventing mutual axial rotation between the two parts.

12. The device in accordance with claim 11 characterised in that the means for preventing mutual axial rotation comprise a narrow zone of the seat having opposed, flat surfaces.

13. The device in accordance with claim 12 characterised in that said zone of the seat is shaped transversely like the letter U.

14. The device in accordance with claim 9 characterised in that in the seat has therein a spring-loaded cursor one end of which is releasably engaged in a complementary axial seat in said complementary portion.

15. The device in accordance with claim 8 characterised in that the recessed seat is surrounded by a ring nut and an array of locking bills, and is arranged axially to receive in an axial bore therein a complementary axial tang formed on the complementary portion of the other element, a spring-loaded pusher is mounted in the bore in the seat for engagement and movement to a retracted position by said other element, said ring nut being operative upon retraction of said pusher to move said balls towards the interior of the seat to be partially received in a peripheral groove in the tang to secure the tang in the seat, a spring urging said ring-nut to a locking position to block the balls in the position of partial reception in the groove in said tang, and said ring nut being movable into a releasing position to effect release of the balls from said groove and to permit disconnection of the tang from the seat.

16. The device in accordance with claim 8 characterised in that the said one coupling element is connected to the second, extension, part of the pusher.

* * * * *